(12) United States Patent
Singhee et al.

(10) Patent No.: US 10,516,767 B2
(45) Date of Patent: Dec. 24, 2019

(54) UNIFYING REALTIME AND STATIC DATA FOR PRESENTING OVER A WEB SERVICE

(71) Applicant: GLOBALFOUNDRIES INC., Grand Cayman (KY)

(72) Inventors: Amith Singhee, Yonkers, NY (US); Steven Hirsch, Burlington, VT (US); Ashok Pon Kumar Sree Prakash, Bangalore (IN); Ulrich A. Finkler, Mahopac, NY (US); David O. Melville, New York, NY (US); Scott M. Mansfield, Vestal, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 685 days.

(21) Appl. No.: 15/131,174

(22) Filed: Apr. 18, 2016

(65) Prior Publication Data

US 2017/0302764 A1 Oct. 19, 2017

(51) Int. Cl.
*G06F 15/173* (2006.01)
*H04L 29/06* (2006.01)
*H04L 29/08* (2006.01)

(52) U.S. Cl.
CPC ............ *H04L 69/161* (2013.01); *H04L 67/02* (2013.01)

(58) Field of Classification Search
CPC ....... H04L 69/161; H04L 47/72; H04L 47/70; H04L 47/193; H04L 67/02
See application file for complete search history.

(56) References Cited

U.S. PATENT DOCUMENTS 6,457,114 B1 9/2002 Klemm et al.
6,457,142 B1 9/2002 Klemm et al.
(Continued)

FOREIGN PATENT DOCUMENTS

CN 103558830 2/2014

OTHER PUBLICATIONS

Werner et al., "Vision Object Access and Management with Usage of the In-Memory Databases," Advanced Technologies for Intelligent Systems of National Border Security. Springer Berlin Heidelberg, 2013. 231-245.
(Continued)

*Primary Examiner* — Moustafa M Meky
*Assistant Examiner* — Kidest Mendaye
(74) *Attorney, Agent, or Firm* — David Cain; Hoffman Warnick LLC (57) ABSTRACT

A method of presenting data over a Web service interface includes: establishing, by a first computer process, a persistent transmission control protocol (TCP) network connection between the first computer process and a second computer process; dynamically allocating, by the second computer process, memory in response to receipt of static data over the persistent TCP network connection from the first computer process; updating, by the second computer process, the memory in response to receipt of dynamic data received over the persistent TCP network connection from the first computer process; and enabling, by the second computer process, a Web server to access the updated data for presentation by the Web service interface. The static data identifies a given entity and the dynamic data includes metric data provided for the entity.

20 Claims, 4 Drawing Sheets

(56) References Cited

U.S. PATENT DOCUMENTS

| | | | |
|---|---|---|---|
| 7,051,038 B1 | 5/2006 | Yeh et al. | |
| 7,107,260 B2 | 9/2006 | Namamura et al. | |
| 7,171,454 B2 | 1/2007 | Nguyen | |
| 7,187,658 B2* | 3/2007 | Koyanagi | H04L 12/5692 370/254 |
| 7,289,967 B1* | 10/2007 | Brader-Araje | G06Q 30/0625 705/26.3 |
| 7,307,952 B2* | 12/2007 | Gross | H04L 69/16 370/232 |
| 7,895,299 B2* | 2/2011 | Betts | H04L 67/327 370/230 |
| 8,156,140 B2 | 4/2012 | Roshen et al. | |
| 8,213,387 B2* | 7/2012 | Xia | H04L 12/4633 370/331 |
| 8,719,219 B2 | 5/2014 | Mao et al. | |
| 8,849,747 B2 | 9/2014 | Balko et al. | |
| 9,948,722 B2* | 4/2018 | Cao | H04L 69/16 |
| 2003/0009443 A1 | 1/2003 | Yatviskiy | |
| 2003/0014524 A1* | 1/2003 | Tormasov | G06F 9/505 709/226 |
| 2003/0145101 A1* | 7/2003 | Mitchell | H04L 29/06 709/236 |
| 2012/0221805 A1* | 8/2012 | Hjul | G06F 9/5016 711/154 |
| 2016/0164969 A1* | 6/2016 | Li | H04L 67/10 709/205 |

OTHER PUBLICATIONS

Molka et al., "Memory-aware sizing for in-memory databases," Network Operations and Management Symposium (NOMS), 2014 IEEE. IEEE, 2014.

Rabi et al., "Solving big data Challenges for enterprise application performance management," Proceedings of the VLDB Endowment. 5(12)1724-35 (2012).

* cited by examiner

UNIFYING REALTIME AND STATIC DATA FOR PRESENTING OVER A WEB SERVICE

BACKGROUND

The present invention relates to the field of visualization of sensor data. Sensors report readings in real time. Certain applications enable users to visualize these readings or an analysis of these readings in a user interface (UI). A WEB browser is a popular UI platform for presenting these readings. Such browsers and applications typically access data at their own rate and from some data service. Traditionally, such a data service runs queries for the requested data against a relational database or other persistent data store. However, for real-time, low latency applications, such an architecture does not scale well if the data has to be first written into a database and then queried, particularly when there might be multiple writes and queries running simultaneously. Further, the arrival rate of data or analysis results can be completely different from the request rate from the web application.

Thus, there is a need for a new architecture that does not suffer from issues of scalability and data rate differences.

SUMMARY

An exemplary embodiment of the present invention provides a method for presenting data over a Web service interface. The method includes: establishing, by a first process, a persistent transmission control protocol (TCP) network connection between the first process and a second process; dynamically allocating, by the second process, memory in response to receipt of static data over the persistent TCP network connection from the first process; updating, by the second process, the memory in response to receipt of dynamic data received over the persistent TCP network connection from the first process; and enabling, by the second process, a Web server to access the updated data for presentation by the Web service interface. The static data identifies a given entity and the dynamic data includes metric data provided for the entity.

An exemplary embodiment of the present invention provides a method of presenting data over a Web service interface. The method includes: establishing, by a first process, a first persistent transmission control protocol (TCP) network connection between the first process and a second process; dynamically allocating, by the second process, memory in response to receipt of static data over the first persistent TCP network connection from the first process; establishing, by a third process, a second persistent transmission control protocol (TCP) network connection between the third process and the second process; updating, by the second process, the memory in response to receipt of dynamic data received over the second persistent TCP network connection from the third process; and enabling, by the second process, a Web server to access the updated data for presentation by the Web service interface. The static data identifies a given entity and the dynamic data includes metric data provided for the entity.

An exemplary embodiment of the present invention provides a computer program product for presenting data over a Web service interface, the computer program product including a computer readable storage medium having program code embodied therewith, the program code executable by a processor, to perform one of the above-described methods.

BRIEF DESCRIPTION OF THE SEVERAL VIEWS OF THE DRAWINGS

Through the more detailed description of some embodiments of the present disclosure in the accompanying drawings, features of the present disclosure will become more apparent, wherein.

DETAILED DESCRIPTION

The inventive concept will be described in more detail with reference to the accompanying drawings, where exemplary embodiments of the present disclosure have been illustrated. Throughout the drawings, same or like reference numerals are used to represent the same or like components. However, the present inventive concept can be implemented in various manners, and thus should not be construed to be limited to the embodiments disclosed herein. On the contrary, those embodiments are provided for the thorough and complete understanding of the present disclosure to convey the scope of the present disclosure to those skilled in the art.

Figure 1:
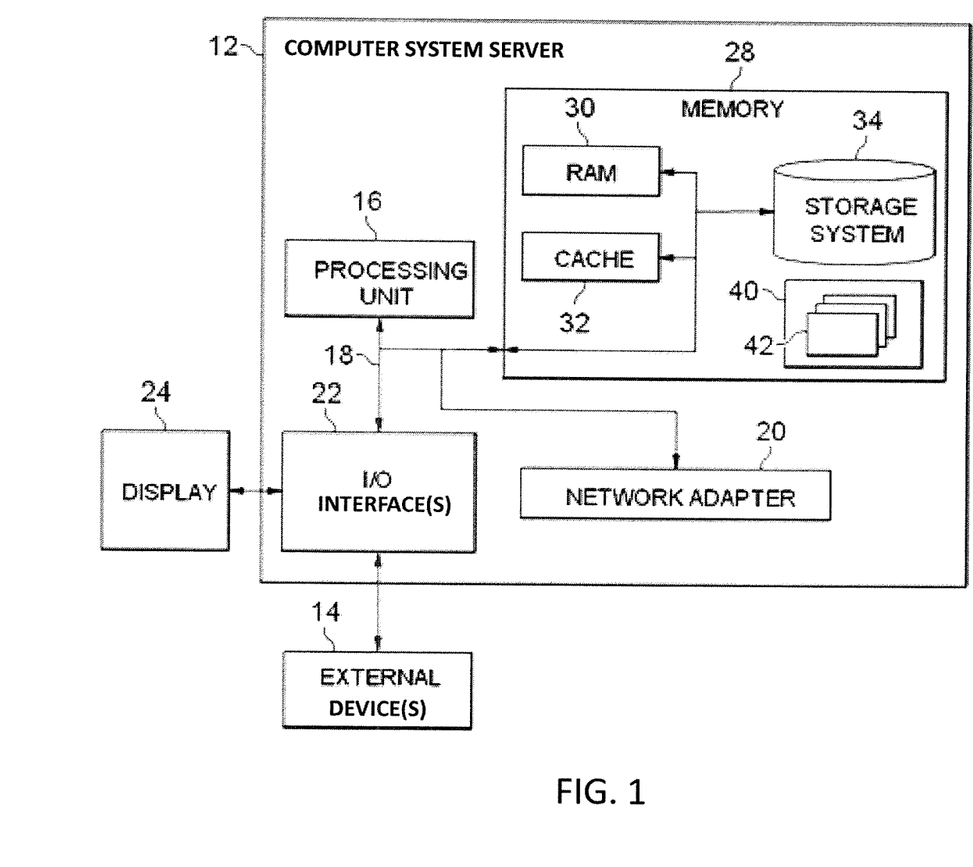
FIG. 1 shows an exemplary computer system/server, which is applicable to implementing embodiments of the present invention.

FIG. 1 illustrates an exemplary computer system/server 12, which is applicable to implementing embodiments of the present invention. Computer system/server 12 is only illustrative and is not intended to suggest any limitation as to the scope of use or functionality of embodiments of the invention described herein.

As shown in FIG. 1, the computer system/server 12 is shown in the form of a general-purpose computing device. The components of the computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

The computer system/server 12 may include a variety of computer system readable media. Such media may be any available media that is accessible by the computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/non-volatile computer system storage media. By way of example, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

A program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer system/server 12 may also communicate with one or more external devices 14 such as a keyboard, a pointing device, a display 24, etc.; one or more devices that enable a user to interact with the computer system/server 12; and/or any devices (e.g., network card, modem, etc.) that enable the computer system/server 12 to communicate with one or more other computing devices. Such communication can occur via Input/Output (I/O) interfaces 22. The computer system/server 12 can communicate with one or more networks such as a local area network (LAN), a general wide area network (WAN), and/or a public network (e.g., the Internet) via a network adapter 20. As depicted, the network adapter 20 communicates with the other components of computer system/server 12 via the bus 18. It should be understood that although not shown, other hardware and/or software components could be used in conjunction with the computer system/server 12. Examples of these other hardware and/or software components include, but are not limited to: microcode, device drivers, redundant processing units, external disk drive arrays, RAID systems, tape drives, and data archival storage systems.

Figure 2:
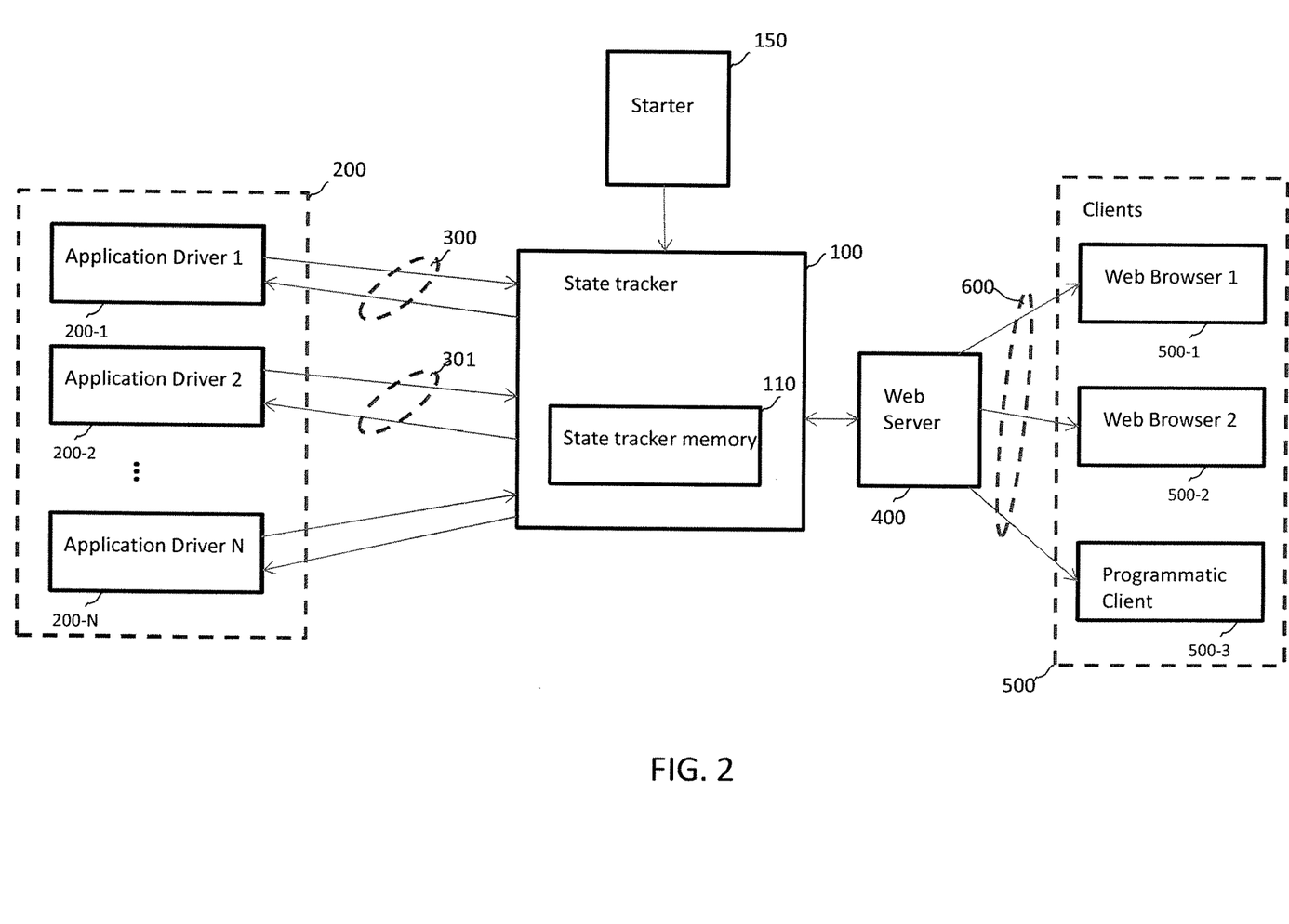
FIG. 2 shows an architecture for presenting data over a web service according to embodiments of the present invention.
Figure 3:
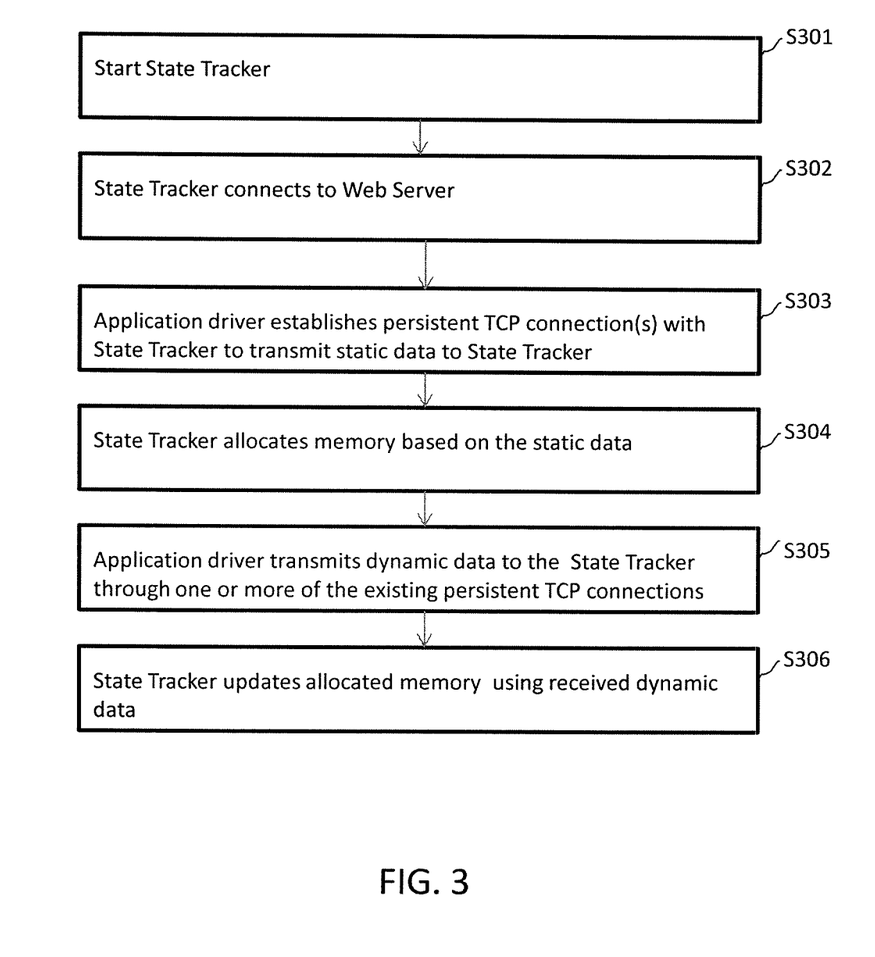
FIG. 3 illustrates a method for using the architecture according to embodiments of the present invention.

FIG. 2 illustrates an architecture according to an exemplary embodiment of the invention that is designed to present data (e.g., metric data) to one or more users over a web service. The architecture includes use of a State Tracker 100, one or more application drivers 200, a web server 400, and one or more clients 500. FIG. 3 illustrates a method of operating the architecture according to an exemplary embodiment of the invention.

The application drivers 200 (e.g., different running computer programs, which may be referred to as computer processes), the State Tracker 100 (e.g., another running computer program or computer process), the Web Server 400, and the clients 500 may run on computer systems like server 12.

If the State Tracker 100 is not currently running, a starter unit 150 or some other mechanism (e.g., a script) starts the stack tracker 100 (S301). The starter unit 150 may be a computer program that is designed to start programs when the server 12 is first powered on. The starter unit 150 may be part of the operating system of the server 12 or a separate program or script that is run by the operating system when the server 12 is powered on. In an exemplary embodiment, the State Tracker 100 is a computer program such as servlet. In an exemplary embodiment, the servlet is a small JAVA program.

Once the State Tracker 100 has been started, the State Tracker 100 establishes a connection to the Web Server 400 (S302).

Next, an application driver (e.g., an application such as 200-1 different from the State Tracker 100) establishes one or more persistent TCP connections with the State Tracker 100 (S303). For example, the application driver that establishes the connections may be referred to as a first process and the State Tracker 100 may be referred to as a second process.

A persistent TCP connection may also be referred to as persistent TCP session. Multiple requests/responses can be sent/received across a single persistent TCP connection. In a persistent TCP connection, the TCP connection is kept alive after it is used to send/receive a single request/response so it can be later used to send/receive future requests/responses, as opposed to opening a new connection for every new request/response.

For example, a persistent TCP connection 300 from the first Application driver 200-1 and the State Tracker 100 may be established by a handshake involving exchanging of SYN and ACK messages between the State Tracker 100 and the corresponding Application Driver. In an embodiment, the persistent TCP connection 300 includes two half-duplex sessions, one for receiving messages and the other for sending messages. Each of the half-duplex sessions may correspond to a different TCP port number. In an exemplary embodiment, the persistent TCP connection 300 includes a single full-duplex session for sending and receiving messages, and corresponds to a single TCP port number. In an exemplary embodiment, the TCP port numbers of the persistent TCP connections are non-HTTP port numbers (i.e., not port 80).

The Application drivers 200 are typically programs that are run on systems that are remote from the system in which the State Tracker 100 is run. An application driver 200 may be located within a device or system that is generating either static data, dynamic data, or both static and dynamic data. An application driver may alternatively be located in a system that is receiving static and/or dynamic data from other data sources. The system may also be processing and/or analyzing the data and sending resulting data to the State Tracker 100.

As an example, a power plant may include a monitoring station that provides the static data and a sensing station that senses environmental conditions (e.g., temperature, pressure, voltage levels, etc.) for providing the dynamic data. For example, if the first application driver 200-1 is located within the monitoring station, it first connects to the State Tracker 100 through one of the persistent TCP connections and sends the static data to the State Tracker 100 (S303).

In an exemplary embodiment, the static data includes one or more definitions of entities and/or sub-entities within a given one of the entities. In an exemplary embodiment, the static data includes at least one of data that identifies a given entity (e.g., identifies a particular facility, power plant, a factory, home, automobile, etc.) and data that identifies a sub-entity (e.g., equipment such as a transformer, generator, chiller, heater, server, UPS, etc.) within the entity and types of dynamic data that are provided for the sub-entity (e.g., temperature data, pressure data, voltage data, etc.). For example, the static data could indicate that the entity is a particular car, which is capable of sending sensor data (e.g., braking data, tire pressure data, temperature data, etc.) or analysis data (e.g., metric data) representing an analysis performed on the sensed data.

The static data may also include the definition of types of entities. For example, if the static data includes the definition of a car type, it indicates that is of type car, and includes metric data such as metrics for speed, braking, tire pressure, and engine temperature. The types of entities can be defined before the entities are identified. Once a given entity type is defined, then any number of those entities can be identified. An application driver is free to define any type of entity it needs.

In an exemplary embodiment, the State Tracker 100 dynamically allocates memory (e.g., see state tracker memory 110) for the entity identified in the received static data. For example, the State Tracker 100 could use a malloc call to request a certain number of blocks of memory from the operating system dynamically based on the received static data. If the State Tracker 100 is terminated, the memory it allocated is no longer available to the State Tracker 100 even if the State Tracker 100 is restarted. For example, the memory is freed up for use by subsequent processes. This differs from a relational database or other persistent storage, where the data is stored in persistent tables. The State Tracker 100 may allocate a fixed amount of memory for each entity it learns about from received static data, or a variable amount of memory based on the quantity of different types of sensor or metric data provided for the entity.

Next, the same application driver (e.g., 200-1) sends dynamic data for the same entity to the State Tracker 100 through an existing TCP connection (S305). The connection activity is performed only once when the Application driver first established the connection in step S303. After that, there is no connection activity, until the connection is broken because either the application driver or the State Tracker 100 closed the connection or there was a connection error. Thus, the same application driver sends the dynamic data for the entity with no-reconnection necessary.

Figure 4:
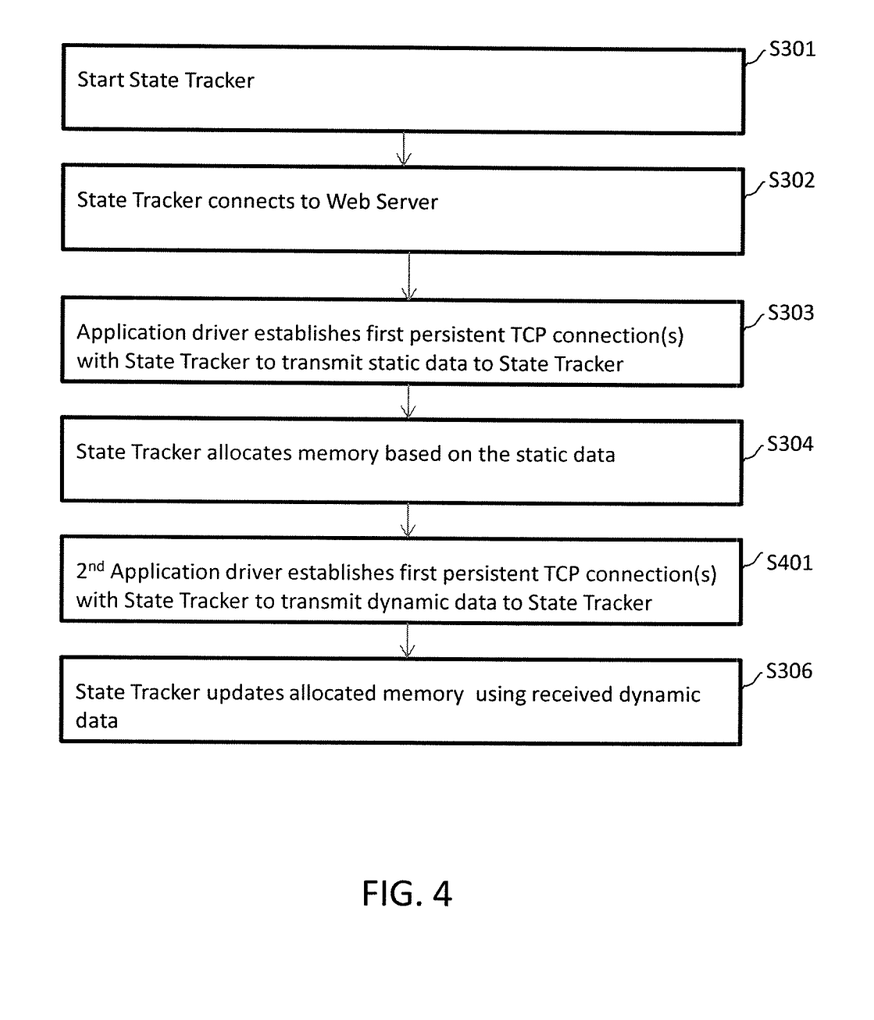
FIG. 4 illustrates a method for using the architecture according to embodiments of the present invention.

FIG. 4 illustrates a variation on the method shown in FIG. 3 according to an exemplary embodiment of the invention, where one Application driver (e.g., the first process) is used to send the static data to the State Tracker 100 (e.g., the second process) and another Application driver (e.g., the third process) is used to send the dynamic data to the State Tracker 100. Similar to the method of FIG. 3, the method includes steps S301-S304, which includes a first application driver 200-1 (e.g., the first process) establishing one or more first persistent TCP connections to the State Tracker 100 (e.g., the second process) and transmission of the static data along the established connection(s). Next, the method includes a second application driver 200-2 (e.g., a third currently executing computer program different and separate from the first and second programs, which may be referred to as a third process) establishing one or more second persistent TCP connections with the State Tracker 100 to transmit the dynamic data to the State Tracker (S401). Similar to the method of FIG. 3, the State Tracker 100 updates the allocated memory using the received dynamic data (S306).

For example, if the first application driver 200-1 located within the ACME power plant previously sent static data identifying the ACME power plant and steam generator1, the second application driver 200-1 monitoring steam generator1 could send dynamic data to the State Tracker 100 indicating the current temperature of steam generator1. In response to receipt of the dynamic data, the State Tracker 100 updates the memory that is allocated based on receipt of the static data (S306). For example, the State Tracker 100 can write the current temperature of steam generator1 it received in the dynamic data into a location of a block of memory it has allocated for temperature data of steam generator1 of the ACME power plant. The dynamic data may be sent in realtime. The dynamic data may include metrics data calculated from sensor data using pre-defined equations or an algorithm. The received dynamic data for a given entity may be sorted using ordered sequence numbers and then stored in association with the entity in the block of memory. The sequence numbers may be based on the time the corresponding dynamic data is received or based on a timestamp received with the corresponding dynamic data in a message received from an application driver. Alternatively, an index may be created on the data that enables fast query of the dynamic data keyed by the sequence number. This index would also be stored in a block of memory (e.g., memory dynamically allocated by the State Tracker 100).

For example, the block of memory allocated for each entity may include different locations for each item within the entity and sub-locations within these locations for each different type of data that corresponds to each item. For example, if the static data indicates the ACME power plant has three generators, and metric data based on a sensed temperature and pressure for each generator is included in the dynamic data, and the State Tracker 100 allocates 60 bytes of memory for the ACME power plant, it could designate that the first 20 bytes is for the metric data of the first generator, the second 20 bytes is for the metric data of the second generator, and the third 20 bytes is for the metric data of the third generator. Please note, the above is merely provided as one example of how the data could be formatted within the dynamic memory allocated by the State Tracker 100.

In an exemplary embodiment, the static data and the dynamic data are formatted so that the State Tracker 100 knows that a given piece of dynamic data relates to a given piece of static data. For example, a first field of the static data could be an entity identifier identifying the entity and the same field in the same position of the dynamic data could include the same entity identifier.

An application driver need not send dynamic data to the state tracker 100 at regular intervals. Accordingly, embodiments of the invention do not require that the dynamic data be sent at regular intervals. The state tracker 100 can then store a history of the dynamic data in the memory it has allocated for the associated entity. The State Tracker 100 can store the history in the order in which it is received or in an order based on timestamps received in the dynamic data. Thus, the State Tracker 100 can retain a pre-determined number of samples of the dynamic data in the right order. Samples older than a pre-determined age can be deleted to conserve resources.

In an embodiment, the State Tracker 100 is started with a pre-defined amount of memory for storing the static and dynamic data, and accordingly the State Tracker 100 need not dynamically allocate memory at runtime, as discussed above.

The State Tracker 100 is configured with the requisite software drivers to interface with the Web Server 400, to enable the Web Server 400 to access the data stored by the State Tracker 100. The clients 500 can access this data using the Web Server 400 that is interfaced with the State Tracker 100. For example, the static and/or dynamic data can be visualized on a Web Browser (e.g., 500-1) of the clients 500. For example, clients such as a web browser (e.g., see 500-1 or 500-2) or a programmatic client 500-3 can interface with the Web Server 400 to retrieve the static and dynamic data stored within the state tracker memory 110 of the State Tracker 100. The Web Server 400 may communicate with the clients 500 across channels 600 using HTTP or REST calls.

In an exemplary embodiment, the static data is formatted to include the services provided by the Application driver and the format of the service call needed to invoke the service. Encoded descriptions of the services associated with the definitions of entity types, entities or metrics can be received over the persistent network connections, for storage in a registry along with an identifier of the source network connection and presented as web services by a web server 400. For example, the definition of an entity type may specify the minimum required fields necessary to identify an entity of a given entity type and the format and/or type of the fields. A service call that affects the definition of an entity type can modify the format, type or number of the fields, add fields to the definition, or delete fields from the definition. A service call that affects an entity can modify data in these fields for the entity, such as the name of the entity, the location/address of the entity. The definition may also identify all sub-entities (e.g., items, equipment, etc.) within the entity. The modification of the stored static or dynamic data is not permitted over the Web service interface. The service calls are meant to be passed to the application drivers, which can in turn make changes to the stored static or dynamic data.

For example, the service call could affect monitoring or data collection by the Application driver. For example, the service call could indicate that samples of certain sensor data used in calculating the metric data is to be collected more/less frequently, the equation or procedure using to calculate the metric data, that certain services are to be stopped/started (e.g., start/stop collecting temperature data from generator1), or that certain functions or adjustments are to be made (e.g., shutdown generator1, restart generator1, etc.). For example, the format of the service call may indicate the format of the call or the message that the Application driver expects to receive in order to invoke the service. For example, the static data could indicate the name of the service call (e.g., startCollectingTemperature( ) turnOffmonitoring( ) Change SamplingFreq( ) etc.), the parameters it needs to be invoked with (e.g., "string generatorName", "string transformerName", "int samplingRate", etc.), and textual information identifying the kind of service being provided (e.g., "collect temperature for a given generator"; "turn off monitoring of a given transformer"; "change sampling frequency", etc.). A service call may affect the associated definition of an entity type, the entities themselves, or the metric data.

The State Tracker 100 can then send information about the services provided to the Web server 400 or make this information available to the Web Server 400 so that the clients 500 can view information about these services or invoke the particular service. For example, the textual description of the services can be automatically generated and made available for discovery via the web service interface. For example, the Web Server 400 could be configured to create one or more graphical buttons on a particular web-page for each available service so users of a Web Browser (e.g., 500-1) can select the corresponding graphical button to invoke the corresponding service. For example, if the button is labeled "start collecting temperature of generator1 of ACME plant", and the user of one of the clients 600 selects the button, the Web Server 400 can indicate to the State Tracker 100 that the service call startcollectingtemperature(generator1) is to be invoked and the State Tracker 100 can then format a message using the correct service call and send the same to a corresponding one of the Application drivers 200 using an existing persistent TCP connection.

An exemplary embodiment of the State Tracker 100 is configured to present the static data and the related real-time dynamic data through a common REST API. This enables service calls through the common API for both real-time and static domains.

In an exemplary embodiment, the State Tracker 100 maintains a geographic information system (GIS) model comprising abstract data objects that represent the entities in the real world. Entities can have static attributes and time series data associated with them. In an exemplary embodiment, the State Tracker 100 maintains a table model holding a 2-dimensional matrix for storing the static and dynamic data. A REST API may be used to build and destroy the models, configure a TCP (non-web) service port, and start and stop services. The models may be constrained and described by a schema that clients 500 discover and obtain via the REST API.

An application driver (e.g., 200-1) may define schemas and create models conforming to the schemas, populate models with static data, post dynamic data to models and refresh/update as required. An application driver may expose remote functions (services) and handle invocations of those functions forwarded from a REST API. An application driver (e.g., 200-1) maintains a persistent TCP connection with a dedicated non-web service port (e.g., non-HTTP) on the State Tracker 100. In an embodiment, query and control methods on the State Tracker 100 appear as a hierarchy of REST resource universal resource identifiers (URIs) at the web server 400. Clients 500 may request updates at whatever periodicity and scope is appropriate for them. Applications can use an API of an application driver to send real-time data to the State Tracker 100, which can then be queried by any arbitrary number of viewers. Since clients 500 may not alter the data, there is no locking overhead inherent to additional viewers and latency is bounded largely by the response time of a modern, multi-thread server (e.g., 12).

An application can open the application driver framework of an Application driver and use model-specific driver classes to define the schemas and populate them with data. The application can create service proxies on the State Tracker 100 and register handler objects to receive forwarded calls against those services. Remote functions can return data directly or cause side-effects (e.g., change operational policy, create/destroy models, set model attributes or push time-series updates to models). The static attributes and dynamically changing time-series data may be made available side-by-side through REST calls. Within a schema, one can define one or more metrics (e.g., time varying quantities) that are typically associated with the schema. In an exemplary embodiment, the schema may define the characteristics of a type of item found in a power plant such as generators, transformers, cables, etc. An entity is instantiated from a schema that describes common characteristics for that class of item and defines the static attributes and types of dynamic data that may be associated with all such instances. A table may be used to hold data associated with the entities.

The units (e.g., drivers, tracker, server, browser, etc) shown in FIG. 2 may be implemented by various manners, including software, hardware, firmware or a random combination thereof. For example, in some embodiments, the apparatus may be implemented by software and/or firmware.

Alternatively or additionally, the system of FIG. 2 may be implemented partially or completely based on hardware. For example, one or more units in the system may be implemented as an integrated circuit (IC) chip, an application-specific integrated circuit (ASIC), a system on chip (SOC), a field programmable gate array (FPGA), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of presenting data over a Web service interface, comprising:
   establishing, by a first computer process, a persistent transmission control protocol (TCP) network connection between the first computer process and a second computer process;
   dynamically allocating, by the second computer process, memory in response to receipt of static data over the persistent TCP network connection from the first computer process, wherein the static data identifies a given entity and a corresponding a set of sub-entities for monitoring metric data of the given entity, and wherein dynamically allocating the memory includes:
      calculating, by the second computer process, a memory request based on the static data, wherein the memory request specifies a variable quantity of memory space for each of the set of sub-entities, wherein the memory request further specifies a different quantity of memory space for at least two of the set of sub-entities, and
      allocating, by the second computer process, an amount of memory for incoming dynamic data for each of the set of sub-entities based on the memory request;
   updating, by the second computer process, the memory in response to receipt of dynamic data received over the persistent TCP network connection from the first computer process; and
   enabling, by the second computer process, a Web server to access the updated data for presentation by the Web service interface.

2. The method of claim 1, further comprising:
   establishing, by a third computer process, a second persistent TCP network connection between the third computer process and the second computer process; and
   sending, by the third computer process, at least one of second static data for second memory allocation by the second computer process and second dynamic data to be used to update the memory or the second memory.

3. The method of claim 1, wherein the persistent TCP network connection is established via a non-HTTP port number.

4. The method of claim 1, wherein the second computer process sorts data within the metric data according to associated sequence numbers, and updates the allocated memory using the sorted data.

5. The method of claim 4, wherein the sequence numbers are time stamps received in the dynamic data.

6. The method of claim 4, wherein the sequence numbers are assigned in order of arrival across the persistent network connection.

7. The method of claim 1, wherein the static data identifies a service call that is invokable by the first computer process to perform a service, and the second computer process provides information for invoking the service call to the Web Server.

8. The method of claim 7, wherein in response to invocation of the service call by the Web Server, the second computer process forwards the service call to the first computer process over the persistent TCP network connection.

9. The method of claim 8, wherein execution of the service call by the first computer process affects one of a definition of the type of entity, the entity itself, or the metric data.

10. The method of claim 7, wherein the second computer process provides a textual description of the service to the Web Service for discovery via the web service interface.

11. The method of claim 1, wherein the persistent TCP network connection comprises a first half-duplex session to enable messages to be received by the second computer process from the first computer process, and a second half-duplex session for sending messages from the second computer process to the first computer process.

12. A method of presenting data over a Web service interface, comprising:
   establishing, by a first computer process, a first persistent transmission control protocol (TCP) network connection between the first computer process and a second computer process;
   dynamically allocating, by the second computer process, memory in response to receipt of static data over the first persistent TCP network connection from the first computer process, wherein the static data identifies a given entity and a corresponding a set of sub-entities for monitoring metric data of the given entity, and wherein dynamically allocating the memory includes:
      calculating, by the second computer process, a memory request based on the static data, wherein the memory request specifies a variable quantity of memory space for each of the set of sub-entities, wherein the memory request further specifies a different quantity of memory space for at least two of the set of sub-entities, and
      allocating, by the second computer process, an amount of memory for incoming dynamic data for each of the set of sub-entities based on the memory request;
   establishing, by a third computer process, a second persistent transmission control protocol (TCP) network connection between the third computer process and the second computer process;
   updating, by the second computer process, the memory in response to receipt of dynamic data received over the second persistent TCP network connection from the third computer process; and
   enabling, by the second computer process, a Web server to access the updated data for presentation by the Web service interface.

13. The method of claim 12, wherein each persistent TCP network connection is established via a non-HTTP port number.

14. The method of claim 12, wherein the second computer process sorts data within the metric data according to associated sequence numbers, and updates the allocated memory using the sorted data.

15. The method of claim 14, wherein the sequence numbers are time stamps received in the dynamic data.

16. The method of claim 14, wherein the sequence numbers are assigned in order of arrival across the second persistent network connection.

17. The method of claim 12, wherein the static data identifies a service call that is invokable by the first computer process or the third computer process to perform a service, and the second computer process provides information for invoking the service call to the Web Server.

18. The method 17, wherein in response to invocation of the service call by the Web Server, the second computer process forwards the service call to the first computer process over the first persistent TCP network connection or to the third computer process over the second persistent TCP network connection.

19. The method of claim 18, wherein execution of the service call by the first computer process or the third computer process affects one of a definition of the entity, the entity itself, or the metrics data.

20. A computer program product for presenting data over a Web service interface, the computer program product comprising a non-transitory computer readable storage medium having program code embodied therewith, the program code executable by a processor, to perform method steps comprising instructions for:

establishing, by a first computer process, a persistent transmission control protocol (TCP) network connection between the first computer process and a second computer process;

the second computer process dynamically allocating memory in response to receipt of static data over the persistent TCP network connection from the first computer process, wherein the static data identifies a given entity and a corresponding a set of sub-entities for monitoring metric data of the given entity, and wherein dynamically allocating the memory includes:

calculating, by the second computer process, a memory request based on the static data, wherein the memory request specifies a variable quantity of memory space for each of the set of sub-entities, wherein the memory request further specifies a different quantity of memory space for at least two of the set of sub-entities, and allocating, by the second computer process, an amount of memory for incoming dynamic data for each of the set of sub-entities based on the memory request;

the second computer process updating the memory in response to receipt of dynamic data received over the persistent TCP network connection from the first computer process;

the second computer process enabling a Web server to access the updated data for presentation by the Web service.

* * * * *